United States Patent [19]

Babbs

[11] Patent Number: 5,219,230

[45] Date of Patent: Jun. 15, 1993

[54] VEHICLE SEAT SLIDES

[75] Inventor: Frederick W. Babbs, Nottingham, England

[73] Assignee: Dunlop Cox Limited, United Kingdom

[21] Appl. No.: 971,255

[22] Filed: Nov. 4, 1992

Related U.S. Application Data

[63] Continuation of Ser. No. 627,500, Dec. 14, 1990, abandoned.

[30] Foreign Application Priority Data

Jan. 4, 1990 [GB] United Kingdom ............... 9000181

[51] Int. Cl.⁵ .................... A47B 88/10; B60N 1/08
[52] U.S. Cl. .................................. 384/47; 248/430
[58] Field of Search ............... 384/47, 49, 34, 18; 248/430; 312/341.1

[56] References Cited

U.S. PATENT DOCUMENTS

| | | | |
|---|---|---|---|
| 2,285,616 | 6/1942 | Saunders et al. | 384/47 |
| 3,743,366 | 7/1973 | Tazaki | 384/18 |
| 4,530,540 | 7/1985 | Hayden et al. | 297/341 |
| 4,662,761 | 5/1987 | Hoffmann | 384/49 X |
| 4,725,032 | 2/1988 | Kazaoka et al. | 248/430 |

FOREIGN PATENT DOCUMENTS

| | | |
|---|---|---|
| 0114740 | 8/1984 | European Pat. Off. |
| 3030725 | 3/1982 | Fed. Rep. of Germany |
| 3207972 | 9/1983 | Fed. Rep. of Germany |
| 3631810 | 4/1987 | Fed. Rep. of Germany |
| 2380462 | 9/1978 | France |
| 2595594 | 9/1987 | France |
| 2090127 | 7/1982 | United Kingdom |
| 2108836 | 5/1983 | United Kingdom |

Primary Examiner—Thomas R. Hannon
Attorney, Agent, or Firm—Stevens, Davis, Miller & Mosher

[57] ABSTRACT

A vehicle seat slide comprising an upper, movable member carrying a seat and a lower, fixed member having the same shape and configuration, one member being inverted with respect to the other. The upper member has two downwardly-facing surfaces each supported on balls in two ball races and the lower member has two upward-facing surfaces each supporting the balls in the two ball races.

37 Claims, 4 Drawing Sheets

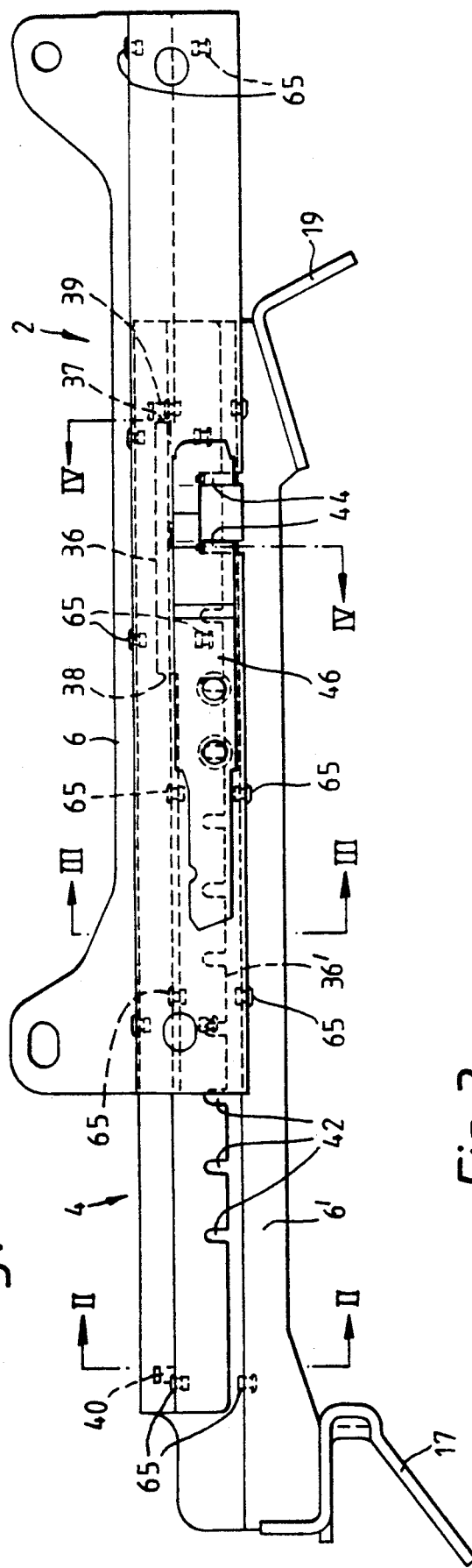
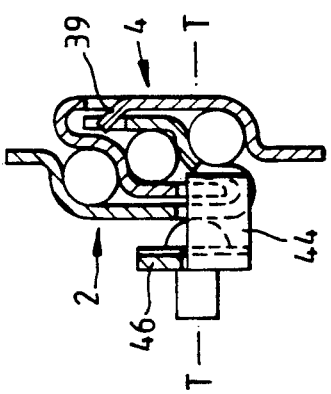
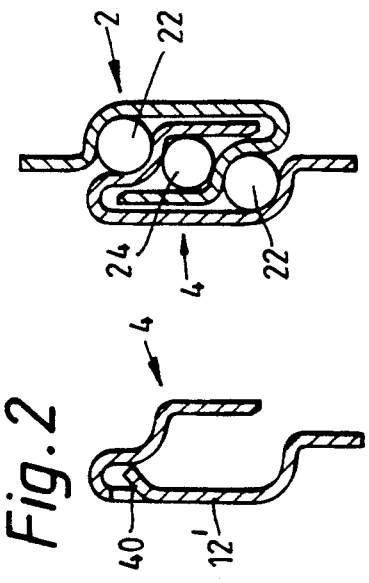

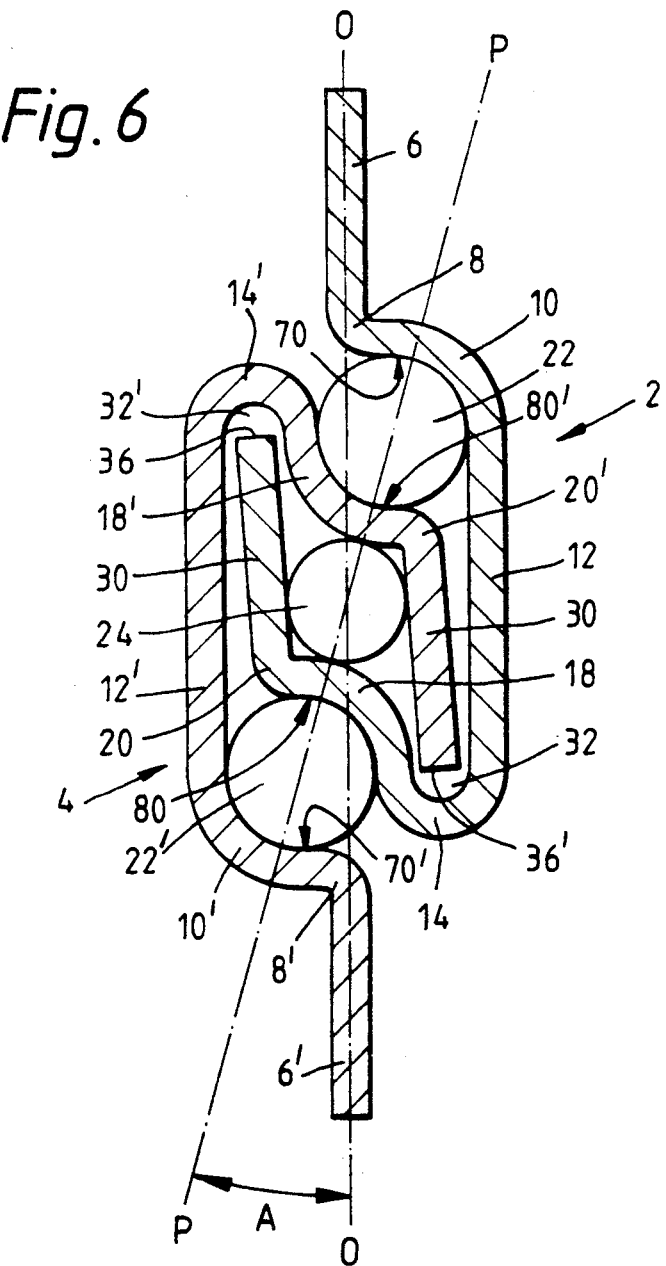

VEHICLE SEAT SLIDES

This application is a continuation of application Ser. No. 07/627,500, filed Dec. 14, 1990 now abandoned.

This invention relates to vehicle seat slides as are provided for the mounting and fore-and-aft adjustment of the seat of a motor car or other vehicle. Such slides comprise a fixed slide member arranged to be fixed to the floor of a vehicle and a movable slide which forms part of or is arranged to be attached to the body of a vehicle seat and slidably retained with respect to the fixed slide member. Such seat slides are generally used in pairs and positioned adjacent opposite sides of a vehicle seat.

In European application No. 84300266.8 (Publication No EP-A-0114740) there is disclosed a vehicle seat slide having a construction such that over those parts of the members which interfit, the shape and configuration of the fixed member is the same as that of the movable member, one being inverted with respect to the other. This similarity of shape and configuration is advantageous in that manufacture is facilitated.

The slide members are interfitted by longitudinal sliding and define three elongate spaces or races one above the other, on each of which there are two or more balls. In fact, there are two balls in the upper and lower races, one at the front and one at the rear, and three larger balls in the central race, one at the front and two at the rear where the loads tend to be higher.

The construction of the seat slide shown in FIG. 3 of EP-A-0114740 is such that the weight of the movable member and of the seat and user is transmitted to the fixed member primarily through the larger balls in the central race whilst the primary function of the smaller balls is to ensure lateral stability and to eliminate rocking and play. However the contact area of the large balls is inherently relatively low and the contact pressures between the large balls and the slide members is therefore relatively high which results in considerable wear and potentially in a reduced service life.

It has also been found that under the loads applied in use the slide members tend to distort and/or separate from one another and from the balls in the races thus causing unwanted rattling. The teeth of a locking trigger forming part of the mechanism for adjusting the seat position also tend to bind in their notches because of the distortion.

It is the object of the present invention to provide a vehicle seat slide which has all the advantages of the construction disclosed in the prior publication referred to above but which overcomes or reduces the disadvantages described.

In accordance with the invention a vehicle seat slide comprises an upper member and a lower member interfitted with one another in sliding relationship, the upper member being adapted to carry a seat and the lower member being adapted to be fixed to the vehicle floor, the upper member being of the same cross-sectional shape and configuration as the lower member, but inverted relative thereto, over those parts of the lengths of the members which interfit, the upper member comprising two downwardly facing surfaces, forming the upper surfaces of two ball races and being supported on a row of balls in each of the two races and the lower member comprising two upwardly facing surfaces forming the lower surfaces of the two ball races and thereby providing support therefor.

Preferably one of the two ball races is positioned generally or vertically above the other ball race.

The seat slide may comprise spacer means, for example a third row of balls in a ball race, between the upper and the lower members.

The upper member may comprise a vertical web for carrying the seat, the web being positioned above the two downwardly-facing surfaces and preferably coplanar with the third row of balls.

Further features and details will be apparent from the following description of two embodiments of the invention given by way of example with reference to the accompanying diagrammatic drawings of which;

FIG. 1 shows a side view of a seat slide in accordance with a first embodiment of the invention;

FIG. 2 shows a cross-section through the lower member on line II—II of FIG. 1;

FIG. 3 shows a cross-section on line III—III of FIG. 1;

FIG. 4 shows a cross-section on line IV—IV of FIG. 1;

FIG. 5 shows a plan view of the trigger member shown in FIG. 1;

FIG. 6 shows the cross-section of FIG. 3 but on a much enlarged scale;

Figure 7:
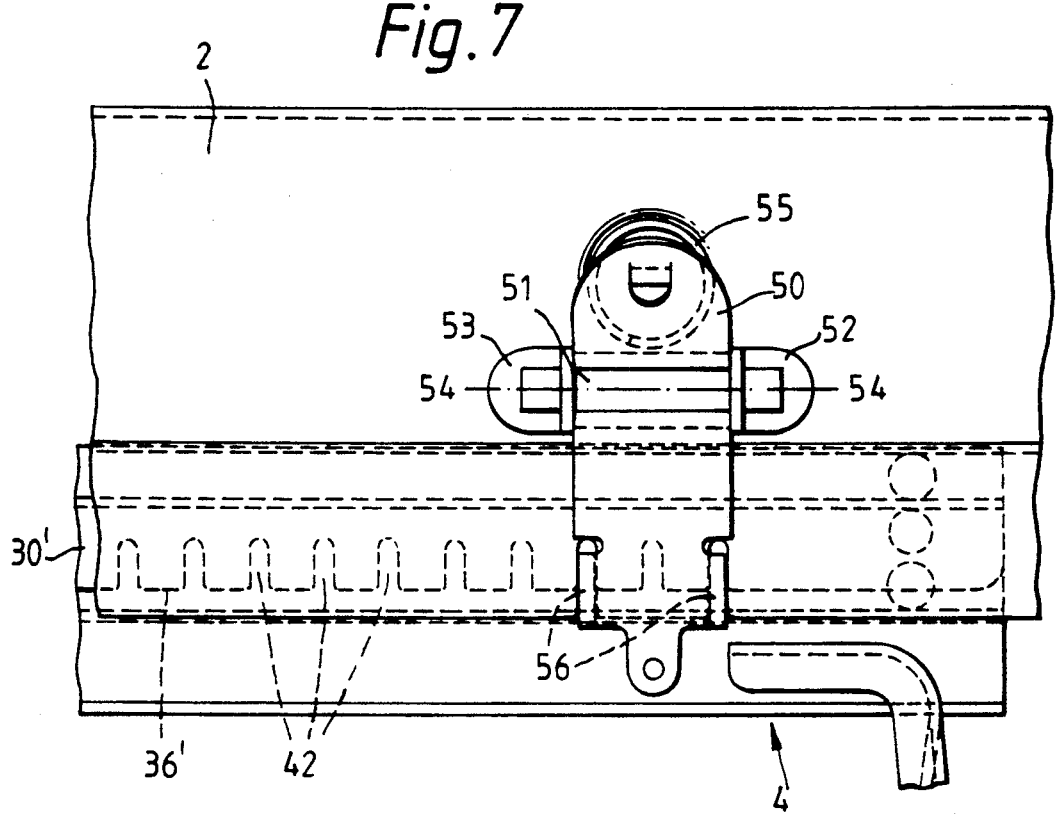
FIG. 7 shows a side view of part of a modified seat slide according to the first embodiment of the invention.

The seat slide of the first embodiment comprises an elongate movable slide member 2 slidably interfitted with a fixed slide member 4. The two slide members are typically formed from slightly resilient steel sheet or strip of substantially constant thickness by conventional metal forming techniques to have the same shape and configuration, so as to define the symmetrical interfitting arrangement shown. The shape and configuration of the interfitting part of the upper member is inverted with respect to that of the lower member. The upper movable slide member includes a vertical web 6 (see FIG. 6) which, in use, forms part of, or carries the body of a vehicle seat. Below the web 6 is a sharp bend 8 through 90° in one sense which is followed by a gentler bend 10, also through 90° but in the opposite sense. Below the bend 10 is a web 12 and this is followed by a bend 14 through 180°, also in the opposite sense. This is followed in turn by a bend 18 in the one sense and a further bend 20 in the opposite sense both through substantially 90°. A flange 30 extends from the bend 20 to end in the groove 32 defined radially inwards of bend 14.

The shape of the fixed slide member is the same as that of the movable member but inverted relative thereto, and the same reference numbers, but each having a superscript, are used in the drawings. The lower vertical web 6′ is adapted to be connected, directly or indirectly, to the floor of the vehicle by means of end brackets 17, 19. The lower web 6′ and the upper web 6 are co-planar.

An upper ball race is defined between the downwardly-facing surface 70 beneath the bend 10 and the upwardly facing surface 80' above the bend 18' of the upper, movable and lower, fixed slide members, respectively. A lower ball race is defined between the downwardly facing surface 80 beneath the bend 18 and the upwardly facing surface 70' above the bend 10' of the upper, movable and lower, fixed slide members, respectively. A central ball race is defined between the bends 20 and 20' of the two slide members, including the facing surfaces of the flanges 30, 30' of the two members. The upper and lower ball races accommodate balls 22 and 22' respectively, typically one at the front and two at the rear of the slide and the central ball race accommodates slightly smaller balls 24, typically one at the front and one at the rear. The line defined by the centres of the balls 24 in the central race lies within the plane 0—0 defined by the upper web 6 and the lower web 16.

Due to the fact that the downwardly facing surface 70 of the first or uppermost bends 8 and 10 in the movable slide member 2 engages the tops of the balls 22 in the upper ball race, the downwardly facing surface 80 of bend 18 in the movable slide member engages the tops of the balls in the lower ball race and the upwardly facing surface 70' of the corresponding bends 8' and 10' in the fixed slide member 4 engages the undersides of the balls 22' in the lower ball race, and the upwardly facing surface 80' of bend 18' in the fixed slide member engages the undersides of the balls in the upper ball race, the weight of the seat and its user is transmitted principally through the balls 22 and 22' in the upper and lower races. The balls 24 in the central ball race exert substantially only a stabilising and locating function. The lines defined by the centres of the three rows of balls in the races lie in the same plane P—P which is tilted at an angle A of about 16° to the vertical as shown in FIG. 6. The limbs of the slide members are somewhat prestressed, i.e. they are deformed from their natural shape by the balls 22, 22' 24, which may be of steel, which helps to ensure that the entire slide remains rattlefree and that the balls rotate and do not slide when the slide members move relative to one another. The positioning of the edges 36, 36' of the flanges 30, 30' in the grooves 32, 32' provides additional safety and strength should the slide be subjected to excessive forces e.g. when the vehicle is in a collision, and helps prevent the two members separating.

As shown in FIGS. 1-5 the upper edge 36 of the flange 30 of the upper slide member (which is shown in its rearmost position) is formed with two vertical shoulders 37, 38 which respectively engage with one of two tags 39, 40 formed in the web 12 of the lower member 4 and bent inwardly into the path of the upper edge 36 of the flange 30 in the upper member, thereby limiting the amount of fore-and-aft movement of the seat carried on the upper slide member 2. The movement of the balls 22, 22' 24 in the races is limited by appropriately positioned pop-rivets 65 or dimples (not shown) in the upwardly and downwardly facing surfaces of the three ball races.

The actual position of the upper slide member (and the seat carried thereon) depends on which two adjacent notches of a series of notches 42 formed along the lower edge 36' of the flange 30' of the lower slide member is engaged by two teeth 44 formed in a spring-biassed trigger member mounted on the upper member 4.

Figure 8:
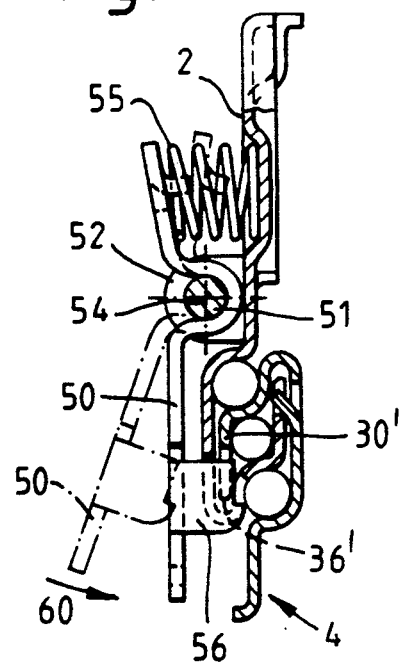
FIG. 8 shows a cross-section on line VIII—VIII of FIG. 7.
Figure 9:
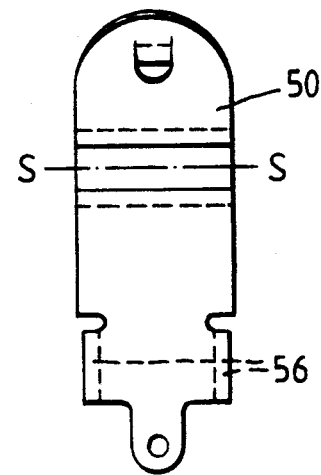
FIG. 9 shows a side view of the trigger member shown in FIG. 7.

Two forms of trigger member are shown; the first, shown in FIGS. 1, 4 and 6 comprises a flat lever 46 formed with two teeth 44 extending perpendicularly to the plane of the lever, mounted to a pivot about a horizontal axis T—T perpendicular to the plane of the seat side (see FIG. 4). A spring (not shown) biasses the teeth 44 generally upwardly into the notches 42. The second form of trigger member is shown in FIGS. 7, 8 and 9 and comprises a plate 50 mounted on a spindle 51 supported by two brackets 52, 53 to pivot about a horizontal axis S—S parallel to the fore-and-aft direction of movement of the slide. A powerful spring 55 biasses the teeth 56 formed at the bottom of the plate into the notches 42 formed along the lower edge 36' of the flange 30' as indicated by the arrow 60 in FIG. 8.

The operation and construction of both forms of trigger member are more fully described in European Patent Application No. 90308271.7 (corresponding to Japanese Patent Application No. 205928/90 and to U.S. patent application Ser. No. 07/559,058) and the content of this prior application is incorporated herein by reference.

In use of the slide it is found that due to the provision of two load bearing ball races i.e. the upper and lower, there is less wear compared with the construction disclosed in EP-A-0114740 and service life is extended. Further it is found that if sideways forces are applied to the upper web 6 then the twisting or distortion which might otherwise occur is prevented. For example, if a clockwise force (as in FIG. 6) is applied to the upper web 6, the upper slide tends to rotate about the balls in the upper race but is prevented from doing so by the reaction of the balls in the lower race. If an anti-clockwise force is applied to the upper web 6 the upper slide tends to rotate about the balls in the upper ball race but is prevented from doing do by the reaction of the balls in the centre ball race.

As is conventional, two such slides will in practice be used together at opposite sides of a vehicle seat to provide the seat slide mechanism. The slides are arranged so that the tilt angle A of the three rows of balls in one slide is in the opposite sense to the same tilt angle in the slide on the other side of the seat for reasons of symmetry.

In a modified form of this first embodiment the slide is not provided with a row of balls 24 in a centre race but instead spacers in the form of hard plastic strips each of U-shaped cross-section are provided in the grooves 32 and 32' above and below the bends 14 and 14' respectively. The strips engage the associated edges 36 and 36' of the flanges 30 and 30' allowing relative sliding of the upper and lower members but at the same time preventing unwanted metal-to-metal contact. Alternatively the edges 36 and 36' may be covered with a coating of a plastic such as polytetrafluoroethylene again to allow sliding and prevent metal-to-metal contact. Both strip and coating provide lateral stability for the two members.

The seat slide of the second embodiment comprises an upper member 102 capable of carrying the vehicle seat and a lower member 104 capable of being fixed to the vehicle floor. The upper member is slidably movable in a fore-and-aft direction with respect to the lower member.

Figure 10:
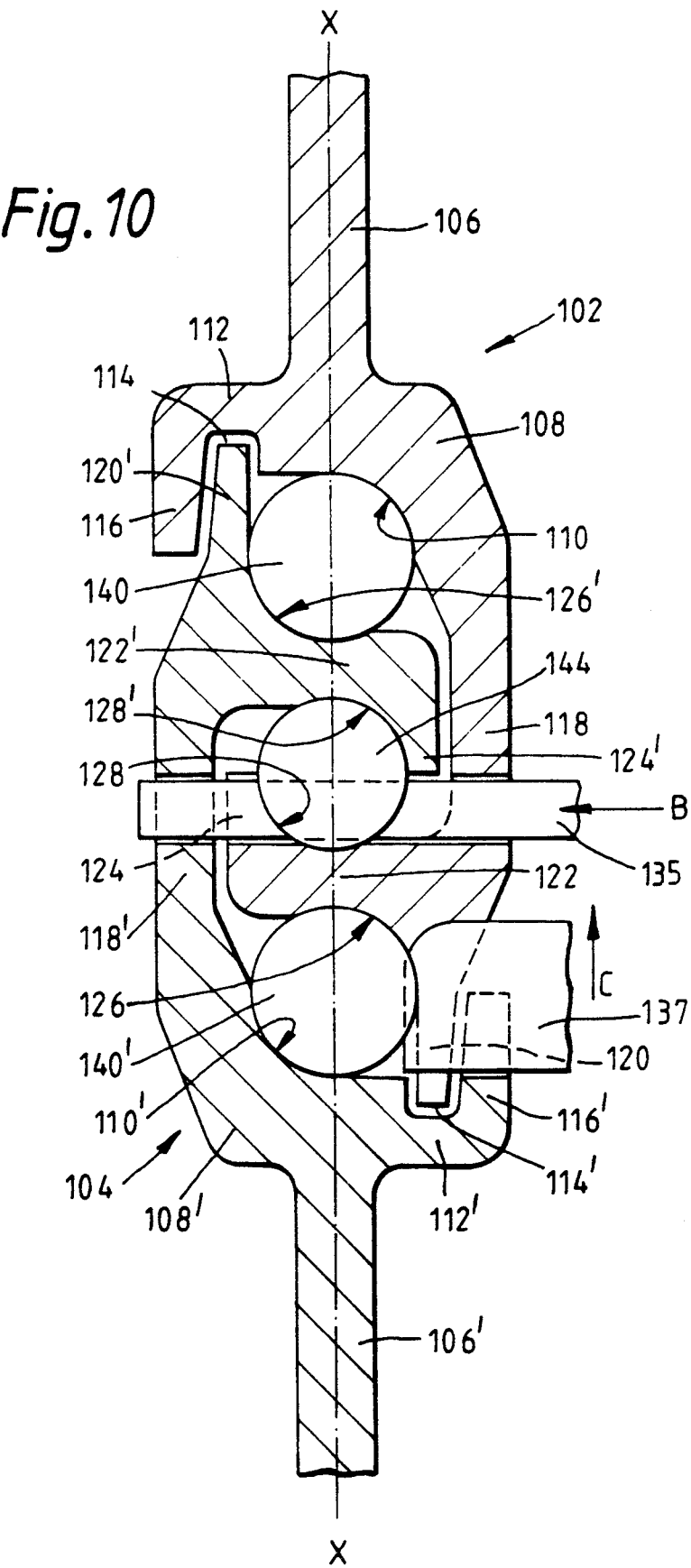
FIG. 10 shows a cross-section through part of a seat slide according to a second embodiment of the invention.

Both members are made by extruding aluminium alloy to have the same cross-sectional configurations. When the two members are in interfitting arrangement, as shown in FIG. 10, the upper member is inverted with respect to the lower member.

The upper member is extruded to comprise an uppermost vertical web 106, which forms part of, or carries, the vehicle seat in use. Below the web 106, on one side (the right-hand as shown in FIG. 10) of the vertical centre-plane X—X, is a shoulder 108 on the underside of which is curved surface 10 extending over approximately 90° arc angle forming the downward facing surface of an upper ball race. On the other side (the left-hand as shown in FIG. 10) of the centre-plane there is an outwards-projecting web 112 on the underside of which is a shallow groove 114. On the outer edge of the web is a downwards-projecting flange 116, the inner side of which forms the outer side of the groove 114.

Beneath the shoulder 108 is a downwards-projecting web 118 which ends in a narrow slightly tapered downwardly-projecting flange 120. Projecting from the web 118 generally horizontally towards and across the centre-plane X—X is a shelf 122 having an upwardly-projecting flange 124. The underside of the shelf and the side of the flange 120 facing the centre-plane X—X is formed with a curved surface 126 extending over approximately 120° of arc to form the upper surface of a lower ball race. The upper side of the shelf 122 and the side of the flange 124 facing the centreplane X—X is formed with a curved surface 128 extending over approximately 120° of arc to form the lower surface of a central ball race.

The lower member 104 has the same configuration as the upper member 102 and the same reference numerals, but with superscripts, have been used to indicate corresponding features. However as stated above, the lower member is inverted with respect to the upper.

It will be appreciated that as in the first embodiment the loads applied to the seat slide in use are carried on three balls 140 and 140' arranged in each of the upper and lower ball races respectively, while the two balls 144 in the central race act as stabilising spacers especially against forces applied sideways. In this embodiment the lines of the ball centres in each race are in a single vertical plane, and co-planar with the plane of the centres of the upper and lower webs, i.e. all lie in the plane X—X.

The flanges 120 and 120' on the upper and lower members respectively locate in, but do not touch the sides of, the respective grooves 114' and 114 in the lower and upper members. This arrangement is for added strength and safety to prevent the slide members separating in an overload situation such as may occur if the vehicle is involved in a collision.

The upper member of the second embodiment, like the upper member of the first embodiment, may carry a trigger member having teeth for engaging in suitable notches in the seat slide and thereby define the position of the upper movable member with respect to the lower, fixed member. The teeth shown by reference numerals 135 and 137 in FIG. 10 may enter from the side as shown by arrow 15 or from below as shown by arrow C by means of mechanisms similar tot hose shown in FIG. 1 (for tooth movement from below) and FIG. 7 (for tooth movement from the side).

A seat slide in accordance with the invention is easy to fix to the floor and it is also easy to have a seat fixed to it. The mechanism for positioning the upper member with respect to the lower is readily incorporated especially as the fixed, lower member can readily be provided with notches or similar apertures without interfering with the ball tracking paths. The upper and lower webs are suitable for carrying other machanisms e.g. a seat height adjustment mechanism, seat belt anchorages etc. The loads applied to the slide in use tend to hold the upper and lower members together, rather than causing them to separate.

The symmetrically inverted members achieve perfect structural balance since the moment of intertia of each is the same and the tendency to separate will be resisted equally by both.

What I claim is:

1. A vehicle seat slide comprising:
    an upper member and a lower member interfitted with one another in a sliding relationship, and including means to prevent unwanted separation of said upper and lower interfitted members on application of an excessive force thereto, the upper member being adapted to carry a seat and the lower member being adapted to be fixed to a vehicle floor, the upper member being of the same cross-sectional shape and configuration as the lower member, said upper member being inverted relative to said lower member, over those parts of the lengths of the members which interfit, said upper member further comprising two downwardly-facing bearing surfaces, said downwardly-facing bearing surfaces forming upper surfaces of first and second ball races, said lower member further comprising two upwardly-facing bearing surfaces, said upwardly-facing bearing surfaces forming lower surfaces of said first and second ball races, a row of balls being disposed in each said first and second ball races, whereby said downwardly-facing bearing surfaces of said upper member is supported on said rows of balls.

2. A vehicle seat slide according to claim 1 wherein one of the two ball races is positioned generally above the other ball race.

3. A vehicle seat slide according to claim 1 wherein one of the two ball races is positioned vertically above the other ball race.

4. A vehicle seat slide according to claim 1 comprising spacer means between the upper member and the lower member.

5. A vehicle seat slide according to claim 4 wherein the spacer means comprises a third row of balls in a third ball race.

6. A vehicle seat slide according to claim 5 wherein the third ball race is positioned between the first and second ball races.

7. A vehicle seat slide according to claim 6 wherein the upper member comprises a vertical web for carrying the seat positioned vertically above and co-planar with the centres of the balls in the third ball race.

8. A vehicle seat slide according to claim 6 wherein the liens defined by the centres of the rows of balls in the three ball races are co-planar.

9. A vehicle seat slide according to claim 7 wherein the plane containing the lines defined by the centres of the rows of balls in the three races is co-planar with the plane of the vertical web of the upper member.

10. A vehicle seat slide according to claim 7 wherein the lower member comprises a vertical web for securing the slide to the vehicle floor, the vertical web of the lower member being co-planar with the vertical web of the upper member.

11. A vehicle seat slide according to claim 1 wherein the upper member comprises a vertical web for carrying the seat, said web being positioned above the two downwardly-facing surfaces.

12. A vehicle seat slide according to claim 11 wherein the vertical web on the upper member adapted to carry the seat is coplanar with a vertical web on the lower member adapted to be fixed to the vehicle floor.

13. A vehicle seat slide according to claim 1 wherein said upper and lower members further comprise metal strips having a substantially constant thickness.

14. A vehicle seat slide according to claim 1 wherein a flange and a groove are formed on each of said upper and lower members, the flange of one said member being disposed within the groove of the other said member, said groove being located alongside and spaced apart from one of said upper and lower ball races respectively.

15. A vehicle seat slide according to claim 1, wherein a flange and groove is formed on each of said upper and lower members, the flange of one said member being disposed within the groove of the other said member.

16. A vehicle seat slide according to claim 1 comprising a flange formed on said lower slide member, a series of notches formed on a lower edge of said flange, a spring loaded trigger member having two teeth and mounted on said upper slide member, any two adjacent notches being engageable by said two teeth for positioning the upper slide member relative to the lower slide member.

17. A vehicle seat slide according to claim 1 wherein the lower member comprises a vertical web for attachment to a vehicle floor, said web being in a position below the two downward-facing surfaces and the central plane of said web passing through the balls in at least the upper of the two ball races.

18. A vehicle seat slide according to claim 1 wherein the upper member comprises a vertical web for carrying the seat, said web being positioned above the two downwardly-facing surfaces and the central plane of said web passing through the balls in at least the lower of the two ball races.

19. A vehicle seat slide comprising:
an upper member and a lower member slidably interfitted with one another and preventing unwanted separation of said upper and lower interfitted members on application of an excessive force thereto, the upper member being adapted to carry a seat and the lower member being adapted to be fixed to a vehicle floor, the upper member being of substantially the same cross-sectional shape and configuration as the lower member, a free end of said upper member inverted relative to a free end of said lower member such that said free ends interfit each other to define a central bearing space therebetween, said upper member further comprising first, second, and third bearing surfaces, said first and third bearing surfaces forming upper surfaces of first and second ball races, said lower member further comprising fourth, fifth, and sixth bearing surfaces, said fourth and sixth bearing surfaces forming lower surfaces of said first and second ball races, said second bearing surface of said upper member and said fifth bearing surface of said lower member defining first and second bearing walls of said central bearing space; and a row of balls being disposed in each said first and second ball races and between said first and second bearing walls of said central bearing space.

20. A vehicle seat slide comprising an upper member and a lower member interfitted with one another in sliding relationship and each member consisting of a single piece of material,
the upper member being of the same cross-sectional shape and configuration as the lower member but inverted relative the lower member over those parts of the lengths of the members which interfit; the upper member comprising
(a) an upwardly-extending web for carrying a seat,
(b) two downwardly-facing surfaces both positioned below the upwardly-extending web and forming the upper surfaces of two ball races,
(c) a groove and a flange; the lower member comprising
(a) a downwardly-extending web for securing the seat slide to the vehicle floor,
(b) two upwardly-facing surfaces forming the lower surfaces of said two ball races, both surfaces being positioned above the downwardly-extending web;
(c) a groove and a flange;
two rows of balls, one row being in one of said two ball races and the other being in the other of said two ball races, the upper member being supported on said two rows of balls and the lower member providing support for said rows of balls, a flange on one of the two members extending downwardly to be located in, but not touching, the sides of the groove on the other of the two members, and the flange on the said other of the two members extending upwardly to be located in, but not touching, the sides of the groove on said one of the two members.

21. A vehicle seat slide according to claim 20 wherein the line joining the centers of the balls in one row is above the line joining the centers of the balls in said other row.

22. A vehicle seat slide according to claim 20 wherein the line joining the centers of the balls in said one row is vertically above the line joining the centers of the balls in said other row.

23. A vehicle seat slide according to claim 20 wherein each one of the upper and lower members comprises a single sheet of material formed by bending to a desired cross-sectional shape and configuration.

24. A vehicle seat slide according to claim 20 wherein each one of the single piece upper and lower members is of metal formed by extrusion to a desired cross-sectional shape and configuration.

25. A vehicle seat slide according to claim 20 wherein the flange on the upper member extends upwardly to be located in the groove on the lower member and the flange on the lower member extends downwardly to be located in the groove on the upper member, the two flanges overlapping one another.

26. A vehicle seat slide according to claim 20 wherein the flange on the upper member extends downwardly to be located in the groove on the lower member and the flange on the lower member extends upwardly to be located in the groove on the upper member.

27. A vehicle seat slide according to claim 20 comprising two facing surfaces, one surface being on the downwardly-extending flange and the other surface being on the upwardly-extending flange, and spacer means between the two facing surfaces.

28. A vehicle seat slide according to claim 27 wherein the spacer means comprises a third row of balls.

29. A vehicle seat slide according to claim 28 wherein the lines joining the centers of the balls in each of the three rows are coplanar.

30. A vehicle seat slide according to claim 28 wherein the lines joining the centers of the balls in each of the three rows all lie in a vertical plane.

31. A vehicle seat slide according to claim 28 wherein the lines joining the centers of the balls in each of the three rows all lie in a vertical plane containing the two webs.

32. A vehicle seat slide according to claim 27 wherein the two facing surfaces are each generally vertical.

33. A vehicle seat slide according to claim 20 wherein the web on the upper member is coplanar with the web on the lower member.

34. A vehicle seat slide according to claim 20 wherein the plane of the web on the upper member passes through the two rows of balls.

35. A vehicle seat slide according to claim 20 wherein the plane of the web on the lower member passes through the two rows of balls.

36. A vehicle seat slide according to claim 20 comprising a flange formed on said lower slide member, a series of notches formed on a lower edge of said flange, a spring loaded trigger member having two teeth and mounted on said upper slide member, any two adjacent notches being engageable by said two teeth for positioning the upper slide member relative to the lower slide member.

37. A vehicle seat slide comprising an upper member and a lower member interfitted with one another in sliding relationship and each member consisting of a single piece of material,
   the upper member being of the same cross-sectional shape and configuration as the lower member but inverted relative to the lower member over those parts of the lengths of the members which interfit;
   each said member being elongate and when viewed in lateral cross-section being substantially "U" shaped with two legs extending outwardly from a central bight;
   (a) a first one of said two legs being longer than a second one of said legs;
   (b) said first leg having a first vertically extending portion adjacent said bight, a second vertically extending portion remote from said bight with a first free end thereon;
   (c) a first generally horizontal portion between said first and second vertically extending portions;
   (d) said first generally horizontal portion being shaped to form a first bearing surface which is located aligned with and in vertical spaced relation from said bight;
   (d) said second leg having a first vertically extending section adjacent said bight and a second vertically extending section remote from said bight with a second free end thereon;
   (f) a second generally horizontal portion between said first and second vertically extending sections;
   (g) said second generally horizontal portion being shaped to form a second bearing surface which is located to be vertically spaced from, but horizontally offset from said bight;
   (h) said upper and lower members being interfitted so that the bight of the upper member faces upwardly and the bight of the lower member faces downwardly with the second free end of the upper member being within the bight of the lower member and the second free end of the lower member being within the bight of the upper member;
   the arrangement being such that said first bearing surface of the upper member faces generally downwardly and toward the second bearing surface of the lower member and the first bearing surface of the lower member faces generally upwardly and toward the second bearing surface of the upper member, said facing bearing surfaces defining an upper and a lower race for positioning bearing means within said upper and lower races.

* * * * *